US008483608B2

(12) United States Patent
Pyhtila et al.

(10) Patent No.: US 8,483,608 B2
(45) Date of Patent: Jul. 9, 2013

(54) MONITORING OF NETWORK CALL ACTIVITY IN A SATELLITE-BASED COMMUNICATION SYSTEM

(75) Inventors: Christopher D. Pyhtila, Sterling, VA (US); Thomas H. Rollins, Ashburn, VA (US); Charles Gumas, Fairfax, VA (US); L. Perry Seip, Ashburn, VA (US)

(73) Assignee: Exelis Inc., McLean, VA (US)

( * ) Notice: Subject to any disclaimer, the term of this patent is extended or adjusted under 35 U.S.C. 154(b) by 453 days.

(21) Appl. No.: 12/756,623

(22) Filed: Apr. 8, 2010

(65) Prior Publication Data
US 2011/0250883 A1 Oct. 13, 2011

(51) Int. Cl.
*H04B 7/185* (2006.01)
(52) U.S. Cl.
USPC .......................................... 455/12.1; 455/405
(58) Field of Classification Search
USPC ..................................... 455/9, 12.1, 405–409
See application file for complete search history.

(56) References Cited

U.S. PATENT DOCUMENTS

| | | | | |
|---|---|---|---|---|
| 4,730,310 A * | 3/1988 | Acampora et al. | ............ | 370/334 |
| 5,483,664 A * | 1/1996 | Moritz et al. | ................. | 455/428 |
| 6,865,268 B1 * | 3/2005 | Matthews et al. | ........ | 379/265.09 |
| 6,999,777 B1 * | 2/2006 | Ganesh | ...................... | 455/456.1 |
| 8,064,898 B2 * | 11/2011 | Carnall | ......................... | 455/423 |

* cited by examiner

*Primary Examiner* — Raymond Dean
(74) *Attorney, Agent, or Firm* — Edell, Shapiro & Finnan, LLC

(57) ABSTRACT

A network monitoring system includes data source routers, data servers, and user interface modules for depicting visual data presentations that show call activity within a satellite-based communication network. The data source routers capture signaling data from a terrestrial portion of the network and supply the signaling data to the data servers. The user interface modules request selected data from the data servers based on selected display filtering settings and generate the visual data presentations, including a geo view, a satellite activity grid, and a message view. The geo view shows a time progression of live or recorded call activity data on a map. The satellite activity grid organizes a time-progression of live or recorded call activity on a two-dimensional grid representing each satellite spot beam in the system. The message view shows a detailed listing of individual messages that have occurred within selected call flows in the network.

27 Claims, 12 Drawing Sheets

| MESSAGE VIEW | | | | | |
|---|---|---|---|---|---|
| NO. | TIME (UTC) | ESL | PORT | DIRECTION | FRAME TYPE | MESSAGE TYPE |
| 1 | THURSDAY, NOVEMBER 05, 2009 @ 22:28:51 | 0 | ETS | INBOUND | I FRAME | LL HGW ACCESS REQUEST |
| 2 | THURSDAY, NOVEMBER 05, 2009 @ 22:28:51 | 0 | ECS | OUTBOUND | I FRAME | LL HGW ACCESS REQUEST |
| 3 | THURSDAY, NOVEMBER 05, 2009 @ 22:28:52 | 0 | ETS | INBOUND | I FRAME | LL HGW ACCESS REQUEST |
| 4 | THURSDAY, NOVEMBER 05, 2009 @ 22:28:52 | 0 | ECS | OUTBOUND | I FRAME | LL HGW ACCESS REQUEST |
| 5 | THURSDAY, NOVEMBER 05, 2009 @ 22:28:53 | 0 | ETS | INBOUND | I FRAME | LL HGW ACCESS REQUEST |
| 6 | THURSDAY, NOVEMBER 05, 2009 @ 22:28:53 | 0 | ECS | OUTBOUND | I FRAME | LL HGW ACCESS REQUEST |
| 7 | THURSDAY, NOVEMBER 05, 2009 @ 22:28:54 | 0 | ETS | INBOUND | I FRAME | LL HGW ACCESS REQUEST |
| 8 | THURSDAY, NOVEMBER 05, 2009 @ 22:28:54 | 0 | ECS | OUTBOUND | I FRAME | LL HGW ACCESS REQUEST |
| 9 | THURSDAY, NOVEMBER 05, 2009 @ 22:28:55 | 0 | ETS | INBOUND | I FRAME | LL HGW ACCESS REQUEST |
| 10 | THURSDAY, NOVEMBER 05, 2009 @ 22:28:55 | 0 | ECS | OUTBOUND | I FRAME | LL HGW ACCESS REQUEST |
| 11 | THURSDAY, NOVEMBER 05, 2009 @ 22:28:56 | 0 | ETS | INBOUND | I FRAME | LL HGW ACCESS REQUEST |
| 12 | THURSDAY, NOVEMBER 05, 2009 @ 22:28:56 | 0 | ECS | OUTBOUND | I FRAME | LL HGW ACCESS REQUEST |
| 13 | THURSDAY, NOVEMBER 05, 2009 @ 22:28:57 | 0 | ETS | INBOUND | I FRAME | LL HGW ACCESS REQUEST |
| 14 | THURSDAY, NOVEMBER 05, 2009 @ 22:28:57 | 0 | ECS | OUTBOUND | I FRAME | LL HGW ACCESS REQUEST |
| 15 | THURSDAY, NOVEMBER 05, 2009 @ 22:28:58 | 0 | ETS | INBOUND | I FRAME | LL HGW ACCESS REQUEST |
| 16 | THURSDAY, NOVEMBER 05, 2009 @ 22:28:58 | 0 | ECS | OUTBOUND | I FRAME | LL HGW ACCESS REQUEST |

FIG.11

MONITORING OF NETWORK CALL ACTIVITY IN A SATELLITE-BASED COMMUNICATION SYSTEM

BACKGROUND

The Iridium satellite system provides worldwide voice and data service to geographically distributed subscriber devices using a constellation of low-earth-orbit satellites. Each satellite contributes an array of antenna spot beams such that the satellite constellation provides coverage over the entire surface of the Earth.

Due to its ability to provide service in locations not reached by terrestrial cell-based wireless communication systems and owing to ongoing enhancements in service capabilities and performance, the Iridium satellite system has seen a continuing increase in subscriber usage. Current and expected future call volumes necessitate enhancements in network monitoring tools to allow system operators and technicians to assess performance, troubleshoot operational problems, and plan system modifications and improvements. In the field of satellite-based communication systems, presently available network monitoring tools are cumbersome and limited and cannot adequately support such network diagnostics and planning. For example, to display a geographic distribution of call activity, it would be necessary to parse historic call records from call records/billing records databases. This approach would result in static views of long-past call activity, with typical delays of hours or days and no real-time analysis capability. Further, there is no ability to associate calls with certain satellites, satellite antenna panels, or antenna beams in a real-time, dynamic display.

An inconvenient and somewhat invasive capability exists to patch into and analyze message traffic by attaching jumper cables at certain points within Iridium terrestrial gateway equipment. The connection mechanism permits only about one-fourth of the message traffic flowing through the equipment to be captured. The technique is generally suitable only for observations that last a limited period of time and produces a large text dump that requires substantial processing to extract information. Even if multiple such connections were to be made, it would be difficult to merge their outputs into a single data stream. Moreover, no capability exists to track and associate calls or to trigger on certain combinations of call attributes to organize information in a meaningful manner.

SUMMARY

The network monitoring system described herein includes a suite of modules, which can be embodied as software applications, that provides real-time status information concerning globally distributed call activity on a satellite-based communication system such as the Iridium satellite system. The call activity information is collected and viewed at various terrestrially located satellite system facilities or network operations facilities. The system is capable of parsing live, streaming data essentially directly from an Earth terminal facility of a satellite-based communication system at the time the data is presented at an observation point. This capability enables "live viewing" of current call activity in real time. Data can also be recorded and past call activity can be displayed in a "playback" mode so that past events can be reviewed. The playback mode can be viewed at normal speed (i.e., the speed at which events actually occurred), in accelerated time (a faster speed), or in expanded time (a slower speed).

Current and historic call activity is presented according to a variety of attributes, including geographic distribution and association with individual satellites, satellite antenna panels, and satellite antenna spot beams. The system generates visual data presentations that allow a user or administrator to observe call activity in a satellite-based communication network. In particular, each of a variety of visual data presentations depicts, in a distinct manner, information concerning globally distributed call activity within the network. In a "geo view" visual data presentation, a time progression of live or recorded call activity data is depicted geographically on a map of the world or a portion thereof. A "satellite activity grid" visual data presentation organizes a time-progression of live or recorded call activity on a two-dimensional grid that allows the user to identify the call load levels for each antenna panel and each spot beam of each of the satellites in the constellation. Optionally, the satellite activity grid has the capability to identify the call types that comprise the call loads.

Using a "message view" visual data presentation, system messaging associated with call activity originating in a geographic region, a particular satellite/antenna panel/spot beam, or with any of a wide variety of specific attributes can be isolated and analyzed to the lowest level of detail, including all the messages/signaling associated with a single call. The message view shows a detailed listing or log of individual messages that have occurred within selected call flows in the network. Each listed item includes a number of fields that provides a detailed textual breakout of information about a particular message.

The network monitoring system has the ability to track and visually present information about individual calls and/or groups of associated calls. Call association can be based on any of several attributes including, but not limited to: temporary mobile subscriber identity (TMSI), dialed digits, space vehicle identifier (SVID), space vehicle beam identifier (SVBID), geolocation, and time. For purposes of problem solving, the network monitoring system allows the presented data to be screened (i.e., filtered) based on a wide variety of system component attributes, which might be useful for identifying faulty system components. Data specific to certain facilities or equipment within the satellite-based communication network (e.g., a gateway facility (GWF) or a telemetry tracking and control (TTAC) facility in the Iridium system) can be isolated to allow evaluation of certain facilities or equipment, independent of others. Data from multiple points in the network can also be aggregated to show overall trends and relative performance. The ability to control filtering (screening) of data according to relevant attributes allows the network monitoring system to display information that is meaningful and useful for evaluating quality of service, diagnosing and troubleshooting problems, and planning system improvements. The network monitoring system's capabilities and functions can be performed passively, without interaction with or requiring additional resource utilization on the satellites themselves.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 11 is a screen shot of a "message view" visual data presentation according to an embodiment of the invention.

DETAILED DESCRIPTION

Figure 1:
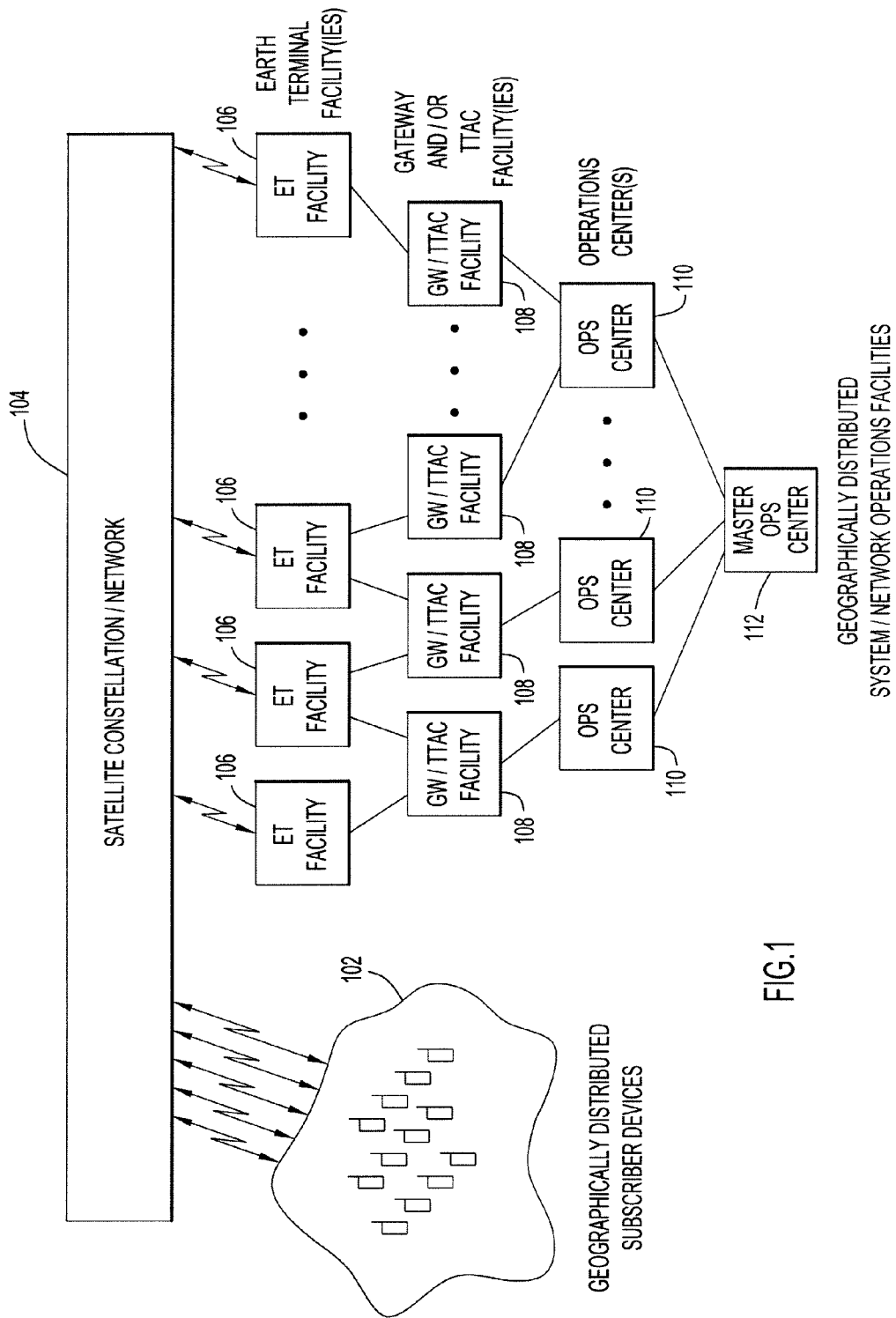
FIG. 1 is a notional block diagram illustrating a hierarchical terrestrial infrastructure for the Iridium satellite system.

At present, the infrastructure of the terrestrial portion of the Iridium satellite system is configured in a hierarchical manner, as shown in FIG. 1. Geographically distributed subscriber devices 102 transmit radio signals to and receive radio signals from satellites in the Iridium satellite constellation 104. Subscriber devices can be wireless telephones or some form of data modem devices and can transmit and receive voice signals and/or data (e.g., text, image, video, etc.). When a subscriber places a call or initiates a transmission, the signal traverses the network, and at least a portion of the signal is often routed to a terrestrial facility within the system. In particular, the satellite constellation 104 typically routes at least the portion of the message data relating to call setup and control to one of the Earth terminal facilities (ETFs) 106 located around the world, which provides a radio-link interface between the satellites 104 and other terrestrial facilities. For example, some ETFs 106 may be linked directly to one or more Gateway (GW) facilities or Telemetry Tracking and Control (TTAC) facilities 108. The gateway facilities handle voice and data traffic and are principally concerned with support of subscriber service and data handling. The TTAC facilities are concerned with satellite control and operation. Operations Centers 110 are responsible for operations at one or more gateway or TTAC facility. A Master Operations Center 112 (also called a Satellite Network Operations Center (SNOC)) is responsible for coordination among all the system elements. While not shown in FIG. 1, a backup master Operations Center can also be designated, which can take over as the master Operations Center in the event the primary facility is impaired.

Figure 2:
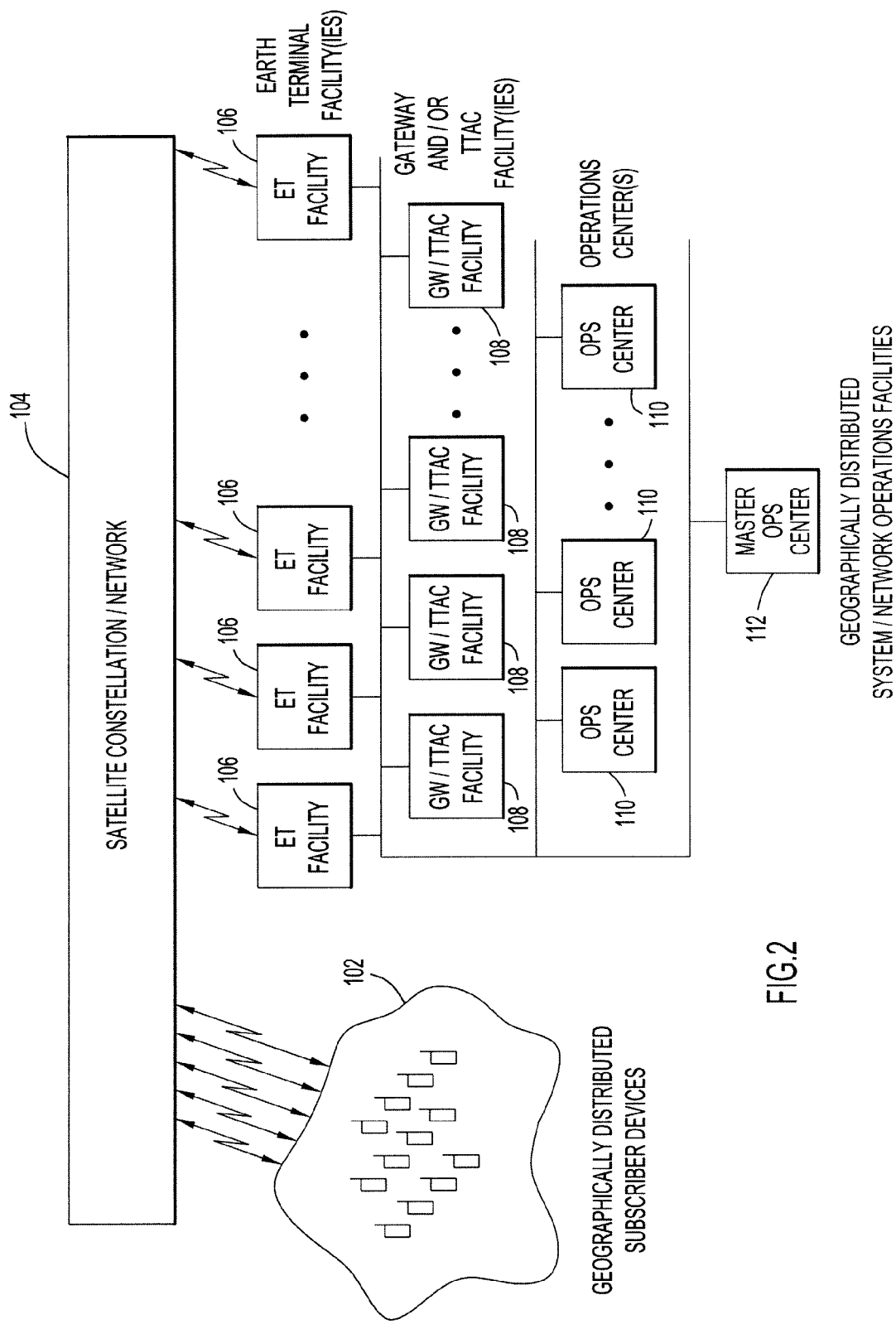
FIG. 2 is a notional block diagram illustrating a routable network terrestrial infrastructure for the Iridium satellite system.

Historically, each GW/TTAC facility 108 has had its own dedicated ETF 106 and Operations Center 110. For example, an Earth terminal facility 106, a gateway facility 108, and an operations center 110 all can be contained in one assembly, one facility, or one locale. Thus, while FIG. 1 shows these components of the terrestrial portion of the Iridium system as separate functional entities, in terms of physical proximity, they can be located together and/or part of the same equipment, or they can be in entirely separate locations. The Iridium system is migrating away from dedicated point-to-point link connectivity to a more richly connected environment in which ETFs are becoming more of a shared resource. Eventually, the entire Iridium system might transition to a configuration that is connected more like a routable network, as shown in FIG. 2.

Figure 3:
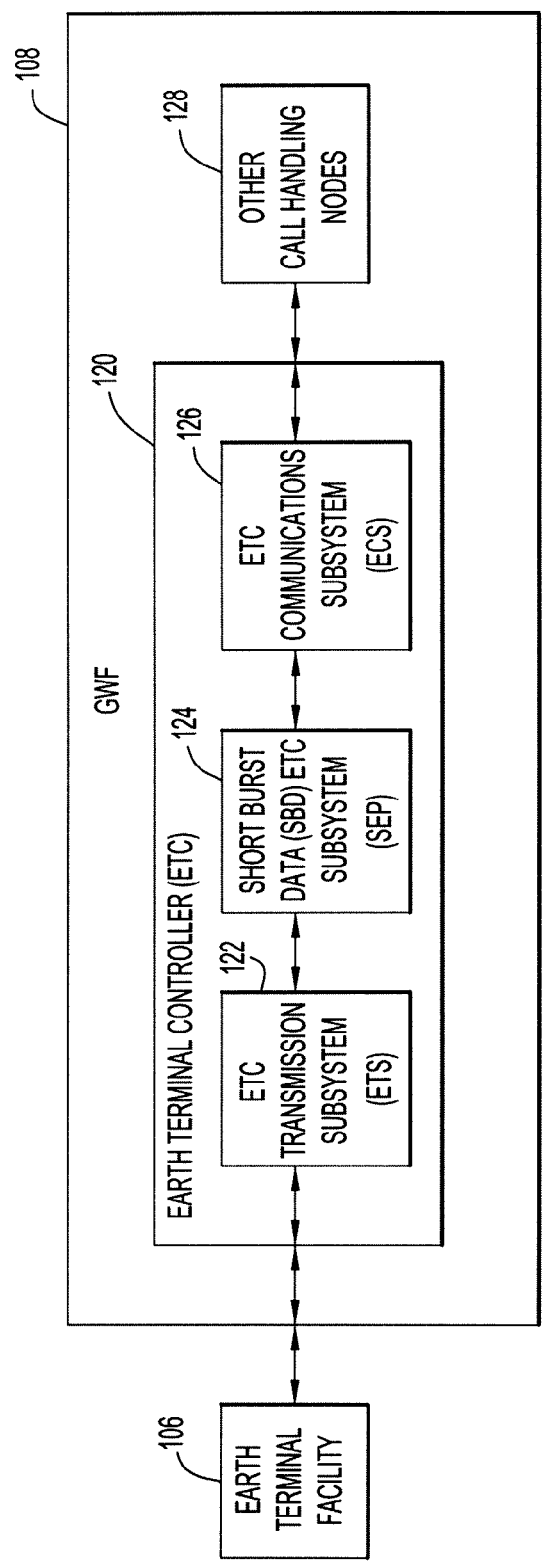
FIG. 3 is a block diagram of selected call-processing components of an Iridium gateway facility (GWF) or telemetry tracking and control (TTAC) facility.

FIG. 3 is a functional block diagram of selected call-processing components of an Iridium gateway (GW) facility 108. Iridium system "calls" are handled by the exchange of Mission Control Data (MCD), more generally denoted as "signaling data," between the satellites 104 and the ETFs 106. This signaling data is not the voice data or call payload information itself but rather behind-the-scenes metadata that contains attributes of the calls, such as information the system uses to set up and handle calls (e.g., satellite hand-off information). Such information can be useful for monitoring operation of the communication network. In existing implementations, Iridium system Mission Control Data is passed from the ETF 106 into the gateway facility 108 on specialized data links that are "point-to-point" (i.e., not routable). In particular, the point-to-point links that first enter a gateway facility 108 are terminated at a system node called the Earth Terminal Controller (ETC) 120, which itself is composed of multiple internal nodes, each connected with point-to-point links.

The signaling data entering the ETC 120 of the gateway facility 108 from the ETF 106 is supplied via point-to-point data links to an ETC transmission subsystem (ETS) 122, a short burst data (SBD) ETC subsystem (SEP) 124, and an ETC communications subsystem (ECS) 126. Data exiting ETC 120 from ECS 126 is supplied via point-to-point data links to other call-handling nodes 128 within the gateway facility 108. As shown in FIG. 3, mission control data (signaling data) can also traverse this point-to-point "signaling data path" in the opposite direction, entering ETC 120 from other calling-handling nodes 128 and exiting ETC 120 in the direction bound for ETF 106. In the future, the signaling data path is likely to become routable within the Iridium system. As described in greater detail below, the useful information contained in the signaling data that traverses the signaling data path can be observed or collected at any access point along this path and supplied to a network monitoring system for analysis, aggregation, and presentation in a meaningful format.

Figure 4:
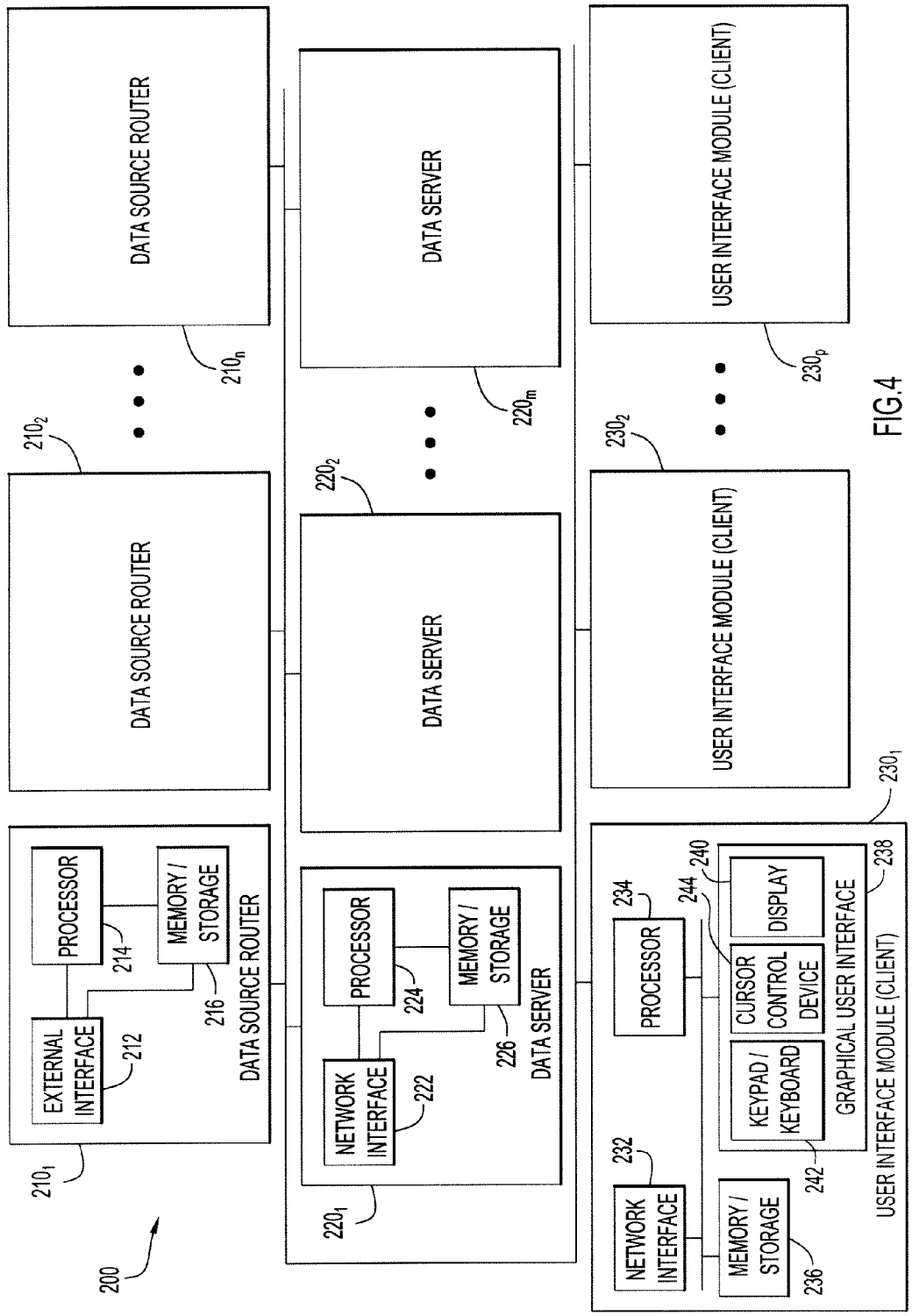
FIG. 4 is block diagram of modules of a network monitoring system for a satellite-based communication network in accordance with an embodiment of the present invention.

FIG. 4 illustrates a network call activity monitoring system 200 for collecting, processing, and displaying information that relates to call activity and system messaging in a satellite-based communication network such as the Iridium satellite system. Network monitoring system 200 includes one or more data source routers $210_1, 220_2, \ldots, 210_n$, one or more data servers $220_1, 220_2, \ldots, 220_m$, and one or more user interface modules $230_1, 230_2, \ldots, 230_p$, where n, m, and p are positive integers. Data source routers 210, data servers 220, and user interface modules 230 can be connected by a routable network, as shown in FIG. 4, or by point-to-point links. The architecture depicted in FIG. 4 is a conceptual diagram illustrating major functional units, and does not necessarily illustrate physical relationships. The network monitoring system described herein can be implemented, for example, as software applications that run on appliances or general purpose computers with network access, such as IP/Ethernet network access.

Each data source router 210 is responsible for capturing signaling data from some point in the terrestrial portion of the Iridium system along the standard signaling data (call handling) path and routing the signaling data to one or more of the data servers 220, for example, in the form of raw, streaming data. In functional terms, each data source router 210 comprises at least an external interface 212, a processor 214, and a memory/storage module 216. External interface 212 provides a coupling to the signaling data path for receiving the signaling data. Essentially, the interface is mechanized to tap into or probe the signaling data without substantially interfering with the flow of the signaling data through the Iridium system, whereby a copy of the signaling data, or at least relevant portions thereof, is produced. External interface 212 also represents the interface required to supply the signaling data to one or more data servers 220 via a point-to-point link or a routable network link. Processor 214 can be, for example, a microprocessor, a microcontroller, a digital signal processor, etc. Memory/storage module 216 is a tangible processor-readable or computer-readable memory, such as a disk or solid-state memory, that stores or is encoded with instructions that, when executed by processor 214, cause processor 214 to perform the functions described herein. Memory 216 may also store various other data and information necessary for operation of data source router 210.

As previously noted, the information of interest to the network monitoring system is not the voice or payload data itself but rather the signaling data that supports the Iridium system calls. The signaling data is essentially metadata comprising call attributes that provide details associated with the handling of call activity. Examples of call attributes include: subscriber identity (TMSI); dialed digits; the identity of the satellite handling the call (SVID); the identity of the antenna panel of the satellite that is handling the call (each Iridium satellite presently has three antenna panels); the identity of the antenna spot beam of the satellite that is handling the call (SVBID) (each satellite has 48 spot beams, 16 on each antenna panel); the geolocation of the subscriber; the identity of the call to which a particular message belongs; attributes specific to the terrestrial facility/equipment handling the routing or signaling data of a call/message; attributes specific to the particular signaling path within the terrestrial facility/equipment that is handling the signaling data of a call/message (e.g., a particular "data pipe"); and time attributes (e.g., the time at which a call/message occurred or a window of time within which a call/message occurred). It will be appreciated that the invention is not limited to these attributes, and any suitable attributes that are available and that would be useful for call activity analysis can be collected and used. Sorting can be performed according to any combination of call attributes in order to provide system operators visibility into characteristics of call activity that would otherwise be hidden and would require extensive effort to extract.

Referring again to FIG. 4, data servers 220 capture and record (archive) the raw signaling data routed from data source routers 220 or call attributes extracted from the signaling data. Data servers 220 also handle requests of access to the data from other modules in network monitoring system 200. Specifically, each data server 220 sends appropriate data to user interface modules 230 at the appropriate time and at the appropriate data rate, based on data requests from user interface modules 230.

In functional terms, each data server 220 comprises at least an interface 222, a processor 224, and a memory/storage module 226. Interface 222 provides a point-to-point or a routable connection to one or more data source routers 210 for receiving signaling data and to one or more user interface modules 230 for supplying requested data. Processor 224 can be, for example, a microprocessor, a microcontroller, a digital signal processor, etc. Memory/storage module 226 is a tangible processor-readable or computer-readable memory, such as disk or solid-state memory, that stores or is encoded with instructions that, when executed by processor 224, cause processor 224 to perform the functions described herein. Memory 226 also stores either raw or processed signaling data and various other data and information necessary for operation of data server 220.

Data servers 220 can supply data to user interface modules 230 in two primary modes: a "live" mode and a "playback" mode. In the live mode, data streaming from a data source router 210 is made immediately available to one or more user interface modules 230. Thus, live mode provides the capability to view call activity in real time. As used herein in the context of displaying data, the term "real time" refers to incorporating newly received data into the information being display within a relatively brief time period after receipt of the data, which permits for internal system delays such as routing and processing of the data. The live mode can be a default or normal operating mode that permits continuous monitoring of current operations at user interface modules 230.

In playback mode, data servers 220 supply data to user interface modules 230 from files that have been stored in memory 226 (e.g., disk storage) so that data from some previous point in time can be replayed in a time-progression manner to allow an operator to review what events happened. Data servers 220 can be configured to supply recorded data at different rates to support viewing of data from past events at normal speed, at accelerated playback speed, or at expanded (slower) playback speed. Optionally, a data server 220 can be configured to supply both live data and recorded data simultaneously to support simultaneous instances of both a live mode and a playback mode on plural user interface modules 230.

Data servers 220 are responsible for responding to requests for data from user interface modules 230. At a minimum, data servers 230 must be able to distinguish between requests for live data and requests for recorded data. Further, data servers 230 can be configured to manage stored data and to extract and supply specific data requested by user interface modules 230 to support generation of specific visual data presentations filtered according to selected call attributes. For example, an operator may configure a user interface module 230 to generate visual data presentations limited to call activity for only a certain geographic region or a certain spot beam for a specific period of time. Optionally, data servers 220 can be sent this filtering information and in response supply only the data required to generate the specific visual data presentations. This approach is preferable from the standpoint of simplifying user interface modules 230 and reducing the amount of data traffic between data servers 220 and user interface modules 230. Another option is to perform some or all of the filtering of data within the user interface module 230 itself.

One or more data servers 220 can also perform aggregation of data from a plurality of data source routers 230 or from a plurality of other data servers 230. For example, a data server located at a master operations center (SNOC) can be configured to collect and aggregate all signaling data being collected by ETF-located data servers and gateway-located data servers to create a comprehensive, system-wide data source that supports system-wide views of system activity. In general, data aggregation can be performed at any location and at any level within the system.

Referring once again to FIG. 4, each user interface module 230 can be embodied as a client application providing a display interface on a console or the like. As shown in FIG. 4, a user interface module 230 includes a graphical user interface (GUI) 238 that allows a user, such as a network technician or engineer, to interact with the network monitoring system (e.g., to enter commands, configure network equipment, select display parameters, and monitor network conditions and performance). GUI 238 includes a display device 240 and user input devices such as a keypad/keyboard 242 and a cursor control device 244. Display device 240 can be any of a wide variety of known devices, such as an LCD display whose optical state is transformed by controlling the color of light emitted by individual pixels based on signals from a processor. Keypad/keyboard 242 allows the user to enter alphanumeric characters, which are displayed on display device 240. Keypad/keyboard 242 can be configured as a physical device and/or as a keyboard or keypad depicted on display device 240. In the latter case, characters can be selected by moving a cursor, or by touching the screen in the case of a touch-screen display. Cursor control device 244 can be any of a variety of mechanisms that allow the user to move a cursor depicted on the display to a desired location to alter the display or to make a selection. For example, cursor control device 244 can be a mouse, a touch pad, one or more keys, a roller ball, or a touch screen (i.e., the display device itself). The graphical user interface (GUI) 238 essentially allows the user to selectively control the format and content of the display device 240 based on input from the keypad/keyboard 242 and/or cursor control device 244. It will be appreciated that GUI 238 may include other types of user-input devices such a microphone, joystick, etc.

User interface module 230 further includes a processing capability represented in FIG. 4 by processor module 234. Processor 234 is capable of executing program instructions (i.e., software) for carrying out various operations and tasks. For example, processor 234 can interpret data and commands received from the user input devices of GUI 238, perform computations, cause information to be stored, and control the display 240 of GUI 238.

A storage capability of user interface module 230 is represented by storage/memory module 236, which can store information relating to information to be displayed, such as data filtering/screening information and display attributes as well as other data or information. Storage/memory module 236 can also store program instructions (i.e., software) to be executed by processor 234 to carry out operations. Thus, the operations and methodologies described herein can be carried out by executing instructions stored on a computer readable medium (i.e., software) on a processor or processors located within the user interface module. As used herein, the term "computer readable medium" refers to tangible media (e.g., memory or storage devices).

The interconnections between the components of user interface module 230 are represented generally in FIG. 4 with a bus structure. A network interface 232 coupled to the bus provides a connection between the components of user interface module 230 and other devices in the network environment (e.g., via an external link) and allows user interface module 230 to send and receive information and commands to and from other devices, such as data servers 220 or even data source routers 210. In general, network interface 232, GUI 238, processor 234, and storage/memory module 236 can be interconnected in any suitable manner. The configuration and components of the user interface module 230 can take many forms and are described herein only in general terms for context. Those skilled in the art will appreciate that the techniques described herein for generating and presenting satellite-based network call activity data are applicable regardless of the particular architecture of the user interface modules.

While FIG. 4 shows a processing environment comprising a data processors 214, 224, and 234 that execute software stored in memories 216, 226, and 236, respectively, an alternative processing environment is a fixed data processing element, such as an application specific integrated circuit (ASIC) that is configured, through fixed hardware logic, to perform certain functions. Yet another possible data processing environment is one involving one or more field programmable logic devices (e.g., FPGAs), or a combination of fixed processing elements and programmable logic devices.

Figure 5:
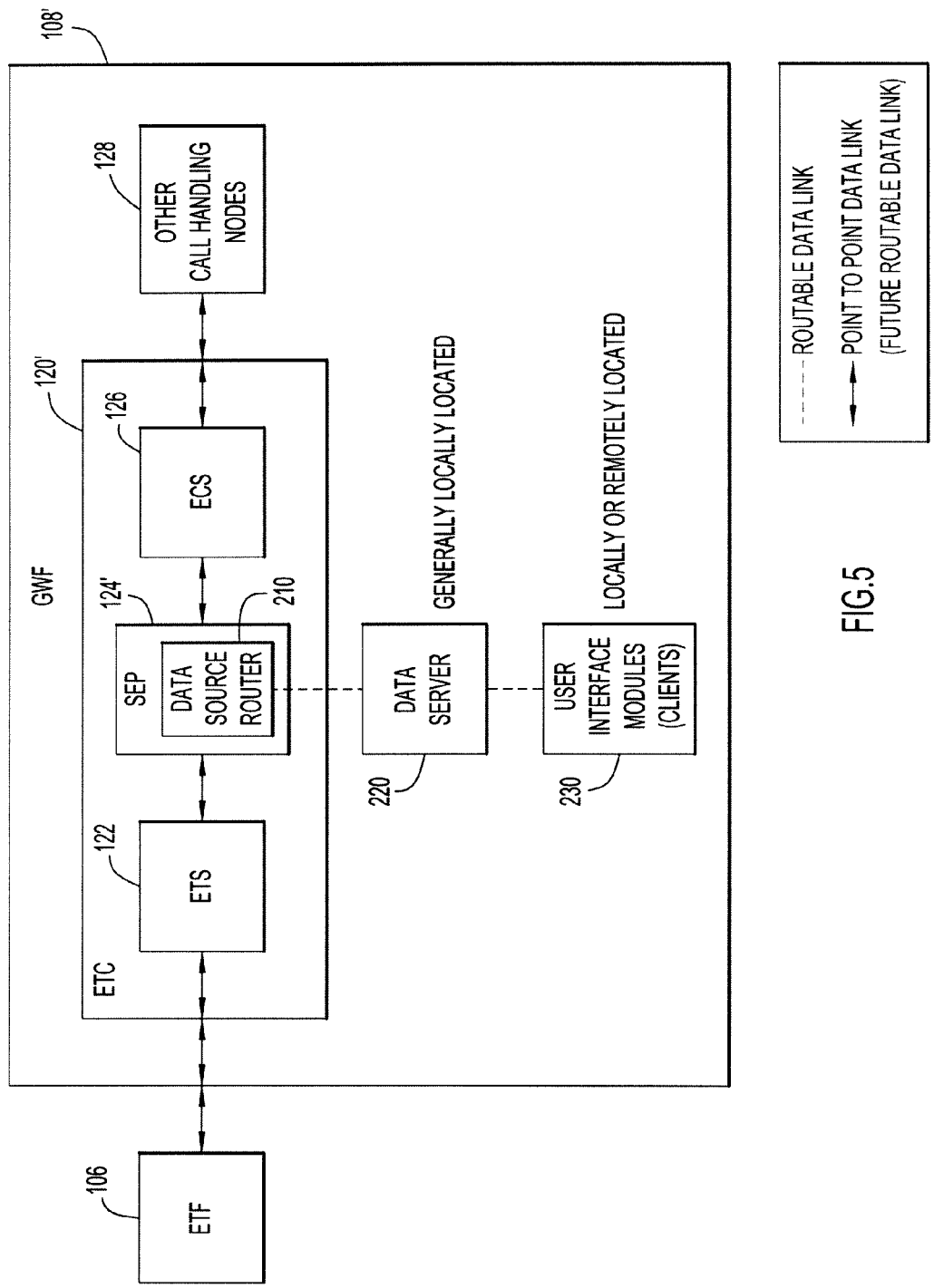
FIG. 5 is a block diagram showing an example of an access point along the signaling data path within an Iridium GWF or TTAC facility from which a data source router of a network monitoring system can extract signaling data.

FIG. 5 illustrates one possible access point as a source for collecting signaling data within the ETC portion 120' of a gateway facility 108'. In this example, a data source router 210 is coupled to or integrated into SEP 124' in order to access the signaling data traveling along the signaling data path that passes through SEP 124'. More generally, data source router 210 can be coupled to the signaling data path at any suitable location within the terrestrial portion of the Iridium system and/or integrated into any hardware or software module that has access to the signaling data, including ETS 122, ECS 126, other points in the ETC 120', other points within the gateway facility 108', at points upstream or downstream of gateway facility 108', or even at the ETF 106. FIG. 5 also shows a data server 220 and one or more user interface modules 230 located locally within the gateway facility 108'. Optionally, data server 220 and user interface modules 230 can be remotely located.

Figure 6:
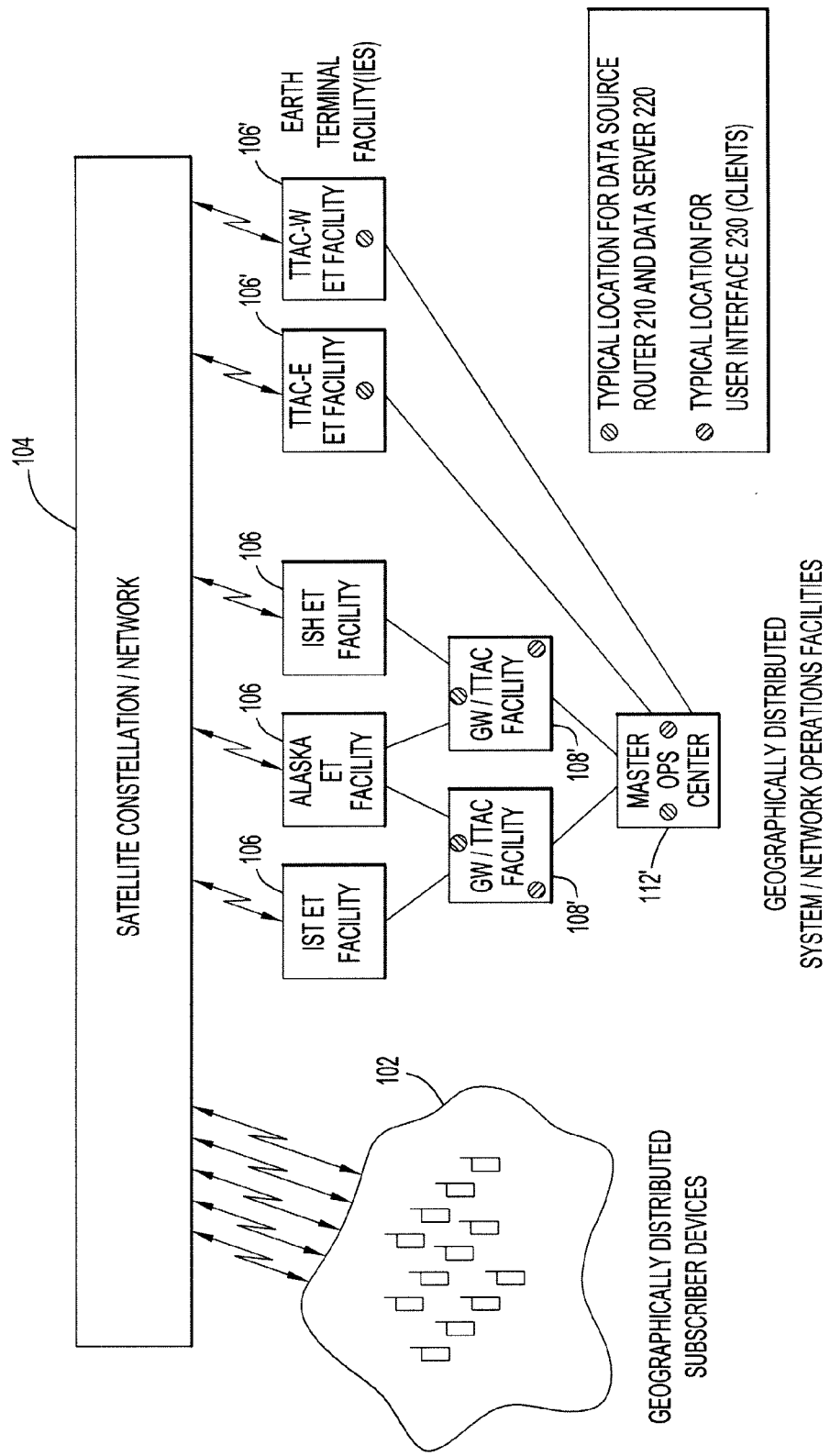
FIG. 6 is a block diagram illustrating an example implementation of a network monitoring system within a hierarchical terrestrial infrastructure for the Iridium satellite system.

FIG. 6 illustrates examples of possible placements of data source routers 210, data servers 220, and user interface modules 230 within a hierarchical terrestrial infrastructure for the Iridium satellite system. In some cases, data source routers 210 and data servers 220 can be located in or integrated directly into Earth Terminal Facilities (ETF) 106'. FIG. 6 also shows data source routers 210 and data servers 220 located in or integrated into gateway facilities 108'. User interface modules (clients) 230 can be located in or integrated into gateway/TTAC facilities 108', operations centers and/or master operations center 112'.

Figure 7:
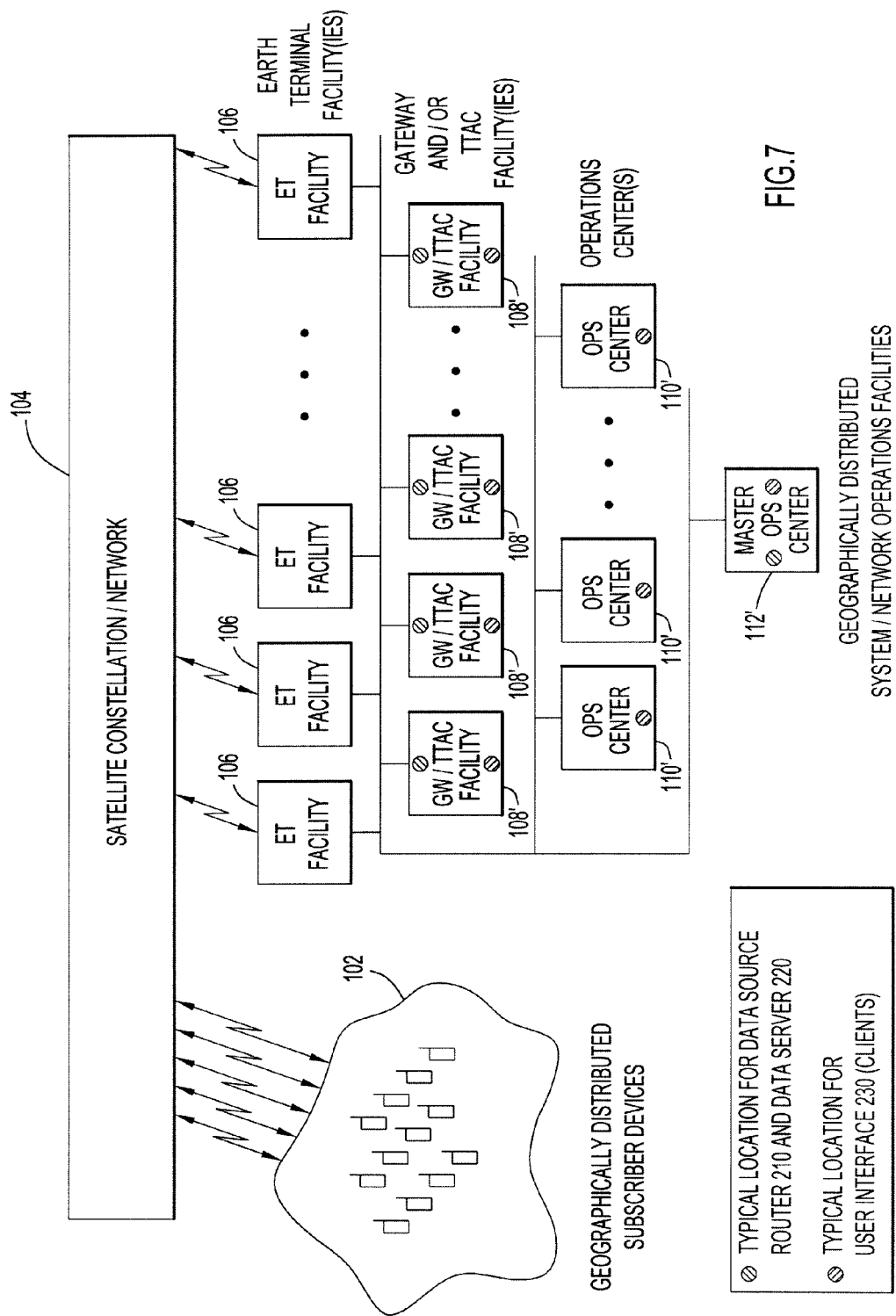
FIG. 7 is a block diagram illustrating an example implementation of a network monitoring system within a routable network terrestrial infrastructure for the Iridium satellite system.

In FIG. 7, examples of possible placements of data source routers 210, data servers 220, and user interface modules 230 within a routable network terrestrial infrastructure for the Iridium satellite system are shown. For example, data source routers 210 and data servers 220 can be located in or integrated into gateway/TTAC facilities 108'. User interface modules (clients) 230 can be located in or integrated into gateway/TTAC facilities 108', operations centers 110', and/or master operations center 112'.

The invention is not limited to the particular examples shown in FIGS. 6 and 7 and, in general, the data source routers 210, data servers 220, and user interface modules 230 can located at any suitable point in the terrestrial portion of the satellite-based communication network, particularly where these components are connected via a routable system. With the adoption of a routable network architecture in future implementations of the Iridium system, the data source routers 210 could be located in a wider variety of network nodes, particularly those nodes that replicate, replace, or augment the functionality of the ETC. Likewise, data servers 220 could reside almost anywhere on the network, so long as signaling data can be delivered to them. In principle, a data server can be located within an ETF 106', a gateway/TTAC facility 108', or an operations center 110'. A number of user interface modules may allow entry or access to network call activity information at a number of locations or via a web-based interface accessible to authorized customers or service provider personnel.

User interface modules 230 (FIG. 4) comprise a client capable of generating at least three principal visual data presentations (i.e., "views" or "displays") of network call activity: a geo view, a satellite activity grid view, and a message view. Each of these visual data presentations can be controlled to depict information about selected call activity within the network. Call activity within the network can be categorized and filtered according to combinations of the above-described call attributes, and the user can observe the call activity of the whole network or just a selected part of it containing only certain call activity.

Figure 8:
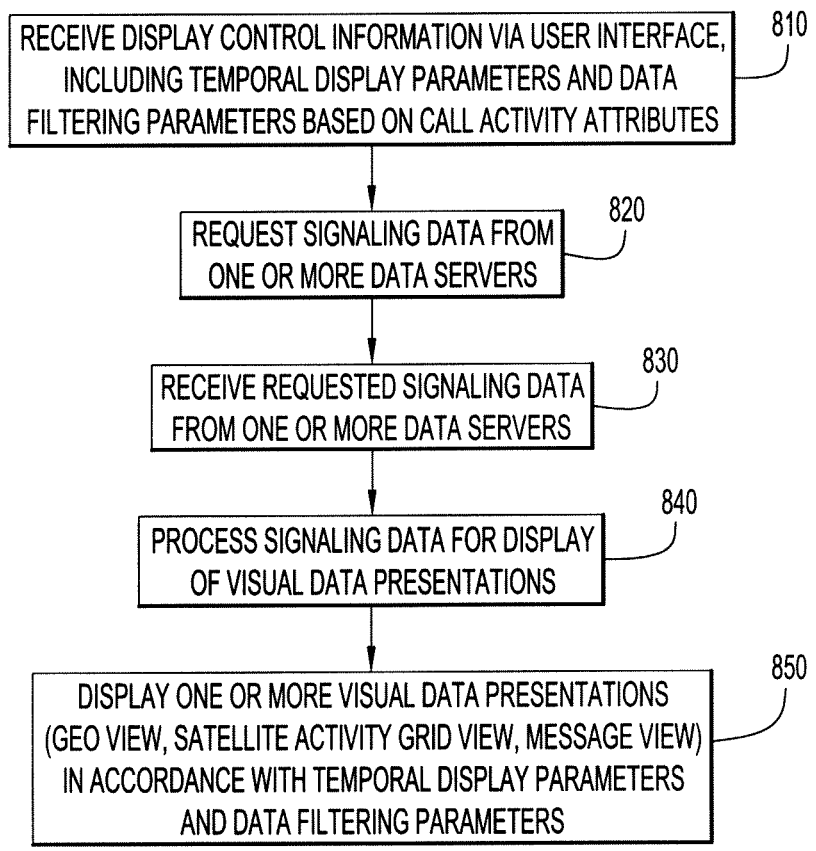
FIG. 8 is a functional flow diagram illustrating operations performed by a user interface module of a network monitoring system to display visual data presentations of call activity within a satellite-based network monitoring system.

FIG. 8 is a flow diagram depicting operations performed by a user interface module 230 of FIG. 4 to generate visual data presentations of network call activity. In operation 810, user interface module 230 receives display control settings from an operator or user via GUI 238. For example, the user can select data filtering options and other display control settings via menus, list, or the like displayed in a window of display 240.

The display control settings includes temporal display parameters. More specifically, a "live mode" can be selected in which data is displayed essentially in real time or near real time, since data is streamed directly to user interface module 230 from data source router 210 via data server 220.

A "playback mode" can also be selected in which data from a previous time period is displayed. In this case, the user can select a past time period of interest by making a time-span selection, which can be specified by entering a start time/date and an end time/date, a start time/date and a duration, or some other equivalent time period delimiters. Since the geo view and the satellite activity grid view are essentially time-progression depictions of call activity over a period of time, the user can also select a playback rate at which the time progression is shown. A normal speed can be selected to show the time-progression playback at the original speed at which the call activity actually occurred (e.g., five minutes worth of events would be viewed in a five-minute span). An accelerated rate can be selected to show the time-progression playback at a faster rate than events actually occurred (e.g., five minutes worth of events could be view in 30 seconds). A slower playback rate can be selected to show the time-progression playback in expanded time (e.g., one minute worth of events could be view over a three-minute period). The playback rate can be entered via a sliding bar displayed in a display window, for example.

Whether in live mode or playback mode, the call activity data shown in the geo view and in the satellite activity grid view reflects activity within a certain time window. In live mode, the call activity data shown at any instant can be an aggregation of the call activity that occurred within, for example, the five minute span preceding that instant, with call activity older that five minutes being continuously dropped from the displayed data as time progresses. Likewise, in playback mode, the data being depicted in the geo view and the satellite activity view for any playback instant reflects the aggregate call activity that occurred in the five minutes (for example) preceding that playback instant. Thus, the time window used to filter the displayed data is a sliding window that moves continuously with the time progression being depicted, with new data being continuously added and older data being continuously dropped from the aggregate data being displayed. The length of the time window used to temporally filter the geo view and satellite view can be another temporal display parameter that is selectable by the user via the GUI 238 (i.e., a time window setting). A shorter time window length acts as a high-gain filter, resulting in depiction that continuously shows only a short span of activity, which may reveal more immediate or sudden changes. Selecting a longer time window length produces a lower-gain filtering effect and may give a more complete picture of recent trends.

To assist in understanding how these user-selectable temporal display parameters operate together, an example is provided. A user selects playback mode along with a playback period of one hour, e.g., yesterday from 08:00 to 09:00. The user further selects an accelerated playback rate, e.g., a playback rate of four times the original speed, such that the playback requires 15 minutes to view the hour's worth of activity. Finally, the user selects a time window length of 10 minutes. Thus, for example, at the point in time the playback is showing the instant 08:15 in the time progression, the call activity data being shown in the geo view and satellite grid activity view reflects call activity that occurred between 08:05 and 08:15.

The display control settings received by user interface module 230 in operation 810 of FIG. 8 can also include data filtering parameters based on call activity attributes that can be used to screen or limit the call activity being depicted in the visual data presentations. As previously described, these call attributes can include, for example: subscriber ID, dialed digits, satellite ID, satellite panel ID, satellite beam ID, subscriber location, call ID, and the identity of terrestrial facility/equipment/signaling paths. For example, GUI 238 can allow a user to select any one or any combination of subscriber IDs for filtering, resulting in only the call activity of those subscriber IDs to be viewed in the visual data presentations. Similarly, GUI 238 can allow a user to select one or a combination of signaling data paths within certain GW/TTAC facilities for filtering, resulting in only the call activity whose signaling data is being handled by those signaling paths to be viewed in the visual data presentations. According to another example, only call activity within one or more specified geographic regions (e.g., within 50 miles of Philadelphia, Pa.) is selected via GUI 238, resulting in only call activity within that geographic region(s) to be viewed in the visual data presentations. Such data filtering commands can be used in combination with each other to isolate specific call activity of interest in the visual data presentations.

Referring again to FIG. 8, in operation 820, user interface module 230 requests signaling data from one or more data servers 220. In the event that all signaling data has been aggregated in one data server 220, the user interface module 230 can send the request to just that data server 220. If the signaling data required to render the visual data presentations resides on plural data servers 220, user interface module 230 can send requests to those data servers 220. Each request includes an indication of whether the data server(s) 220 are to supply current signaling data to support a live mode or stored signaling data to support a playback mode or both (if both live and playback instances of the visual data presentations are being generated simultaneously). In the case of playback mode, the request indicates the time range of the signaling data to be supplied. If the playback data is supplied to user interface module 230 in a streaming manner (i.e., the data is supplied continuously during rendering of the visual data presentation at the rate of the playback), the signaling data request further specifies the rate at which data server(s) 220 are to supply the signaling data to user interface 230 so as to correspond to the playback rate (normal, accelerated, or expanded time). According to another option, data server(s) 220 can supply the required data at a higher data rate, and user interface module 230 can store the data and generate the time progression independent of the data arrival time and rate.

To minimize the volume of data supplied to user interface module 230, at least some of the data filtering information can be supplied to the data server(s) 220 along with the request. For example, the request from user interface module 230 can specify the selected data filtering parameters (e.g., subscriber ID, satellite ID, beam ID, GW/TTAC ID, etc.), thereby instructing data server(s) 220 to supply only the subset of signaling data required to generate the visual data presentations. Optionally, at least some of the data filtering can be performed directly by user interface module 230. In this case, the data request would contain less than all of the data filtering information, and data server(s) 220 would supply a greater set of data than is required to produce the visual data presentations. While somewhat disadvantageous in terms of required data transmission bandwidth, this approach could be used to simplify configuration and operation of data servers 220.

In operation 830, user interface module 230 receives the requested signaling data from the data server(s) 220. As previously mentioned, the signaling data can be streamed, as would be the case with the live mode, or the signaling data can be received at a data rate that is independent of the time progression of the visual data presentations (i.e., either approach could be used in the playback mode). In the latter case, user interface module 230 can store the signaling data or the results of processing the signal data, and then generate the time progression of the visual data presentations from the stored data.

In operation 840, user interface module 230 processes the received signaling data in order to render the visual data presentations. For example, to generate the time window within the visual data presentations, user interface module 230 can temporally aggregate data so that data that falls within the time window is reflected in the depictions in the visual data presentation. At a minimum, this requires adding any new data to the aggregate data and dropping any old data from the aggregate data as the time window slides forward with the time progression. In the live mode, display control settings can be modified by user input received via GUI 238. Such modifications can be relayed to data servers 220 supplying the signaling data to alter the data being sent to user interface module 230 (e.g., the group of satellites whose data is being viewed). Other modifications to the display control settings alter the processing performed by user interface module 230. For example, modifying the time window length alters the data aggregation used to generate the visual data presentations. Optionally, the filtering options specified by the display control settings can be modified on the fly during playback mode as well.

In operation 850, user interface module 230 displays the visual data presentations of call activity in the display 240 of GUI 238. The three visual data presentations (the geo view, the satellite activity grid, and the message view) provided by user interface modules 230 can be configured such that the same underlying data is used to generate the three views simultaneously, allowing an operator to analyze the data from these three different perspectives, with each giving different insight. More than one instance of the application could be open simultaneously so that side-by-side comparisons can be made (e.g., two geo views from two different time periods). Each of these visual data presentations will now be described in detail in connection with the screen shots shown in FIGS. 9-11.

Figure 9:
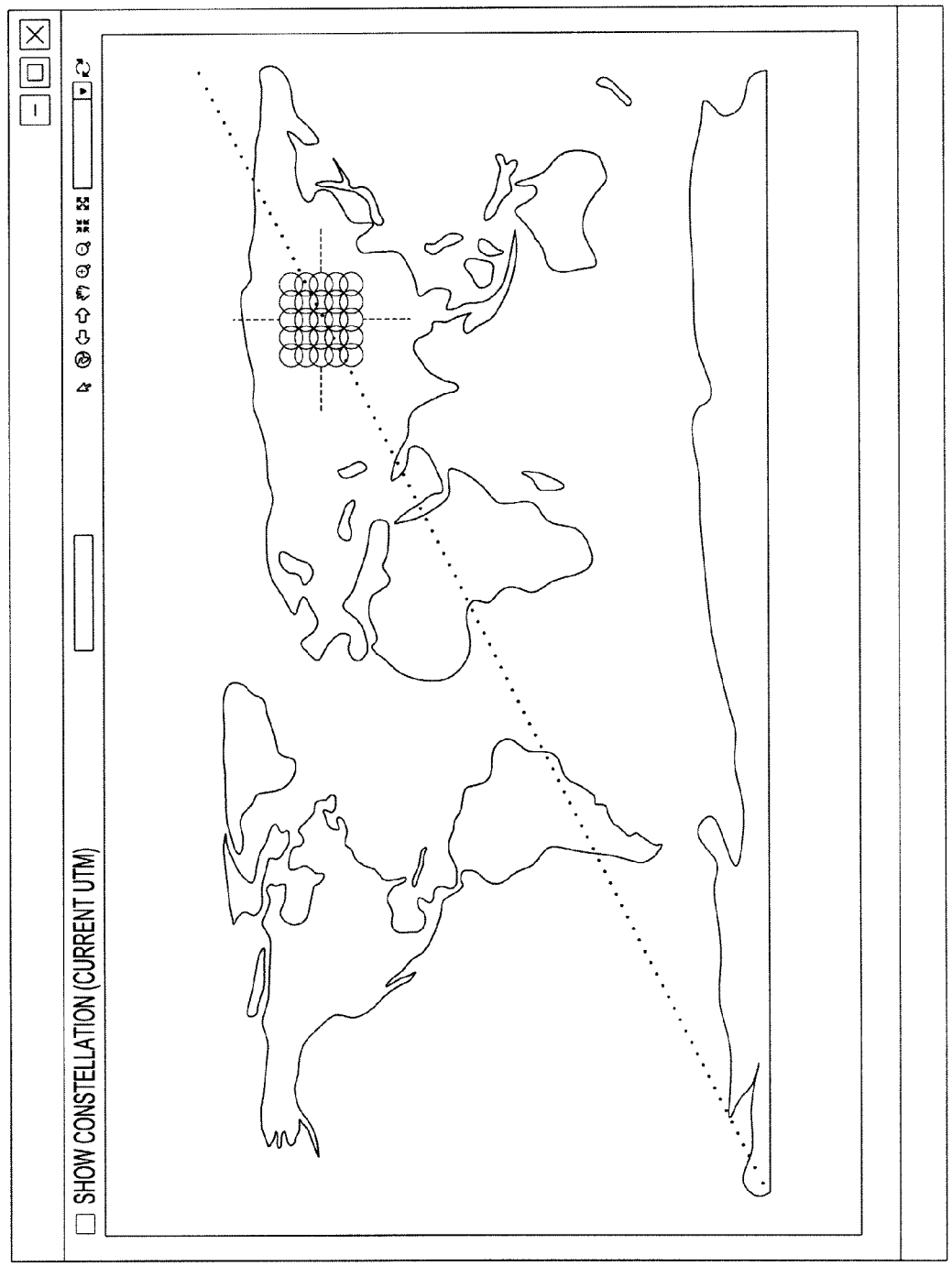
FIG. 9 is a screen shot of a "geo view" visual data presentation according to an embodiment of the invention.

An example of a geo view visual data presentation is shown in FIG. 9. The network monitoring system displays call activity data on a map in a time progression, where the data being shown changes over time. The map can be generated via a Windows client using, for example, ArcGIS mapping technology or the like. Each call or message can be depicted on the map with a point or dot. In the example shown in FIG. 9, the call activity of multiple calls of a single subscriber are shown as the subscriber travels along a path across the Earth (e.g., via aircraft). As previously explained, in either the live mode or playback mode, the length of the time window controls the slice of time whose call activity data is being depicted at any given instant. In this particular example, the time window length would be set to a very high value to show the subscriber traversing a path of this length. More typically, where a wider range of call activity is depicted, the time window length would be set to smaller value (e.g., 10 minutes) to show current trends.

The data being presented in the geo view can be filtered to show only selected call activity information, as previously noted. For example, the user may be able to select or modify display control settings from a drop-down menu or list within the geo view or in another window. Collectively, the points or dots associated with the displayed call activity create a visual impression of the level of call activity as a function of geographic location. At the highest level, the map can be a two-dimensional world view map showing activity worldwide, as in FIG. 9, subject to any filtering specified by the user. With very high call activity in certain areas, optionally, more advanced visual indicators can be used in addition to or instead of points or dots having a one-to-one correspondence with calls or messages. For example, color indicators or different icons that represent differing levels of call activity can be shown on the map.

Optionally, the geo view permits the user to zoom in to focus more closely on certain regions of interest and to zoom back out. For example, zooming can be implemented with icons or a slider bar or by designating a certain area with a cursor or touch screen (e.g., by circling or pointing to an area of interest).

The geo view can also include a feature that gives the user the option to overlay the satellite beam footprints on the map, indicating where the satellite footprints or, optionally, satellite spot beams are currently located. In FIG. 9, such an overlay is shown only on a limited portion of the map (in central Asia) for clarity. In practice the overlay can cover the entire map being depicted. The beam footprints can be depicted via lines (as shown in FIG. 9) or by different colors, for example.

GUI 238 can be configured to include a hover ("mouse over") feature within the geo view, whereby hovering over a data element dot with a pointer or mouse-controlled cursor causes additional information about the data element to be displayed in a pop-up box or window which can be temporarily overlaid on a portion of the map. Optionally, the items in the list displayed as a result of the cursor hover-over can have hyperlinks to different visual data presentations with more detailed information about the call activity represented by the point or dot.

Figure 10:
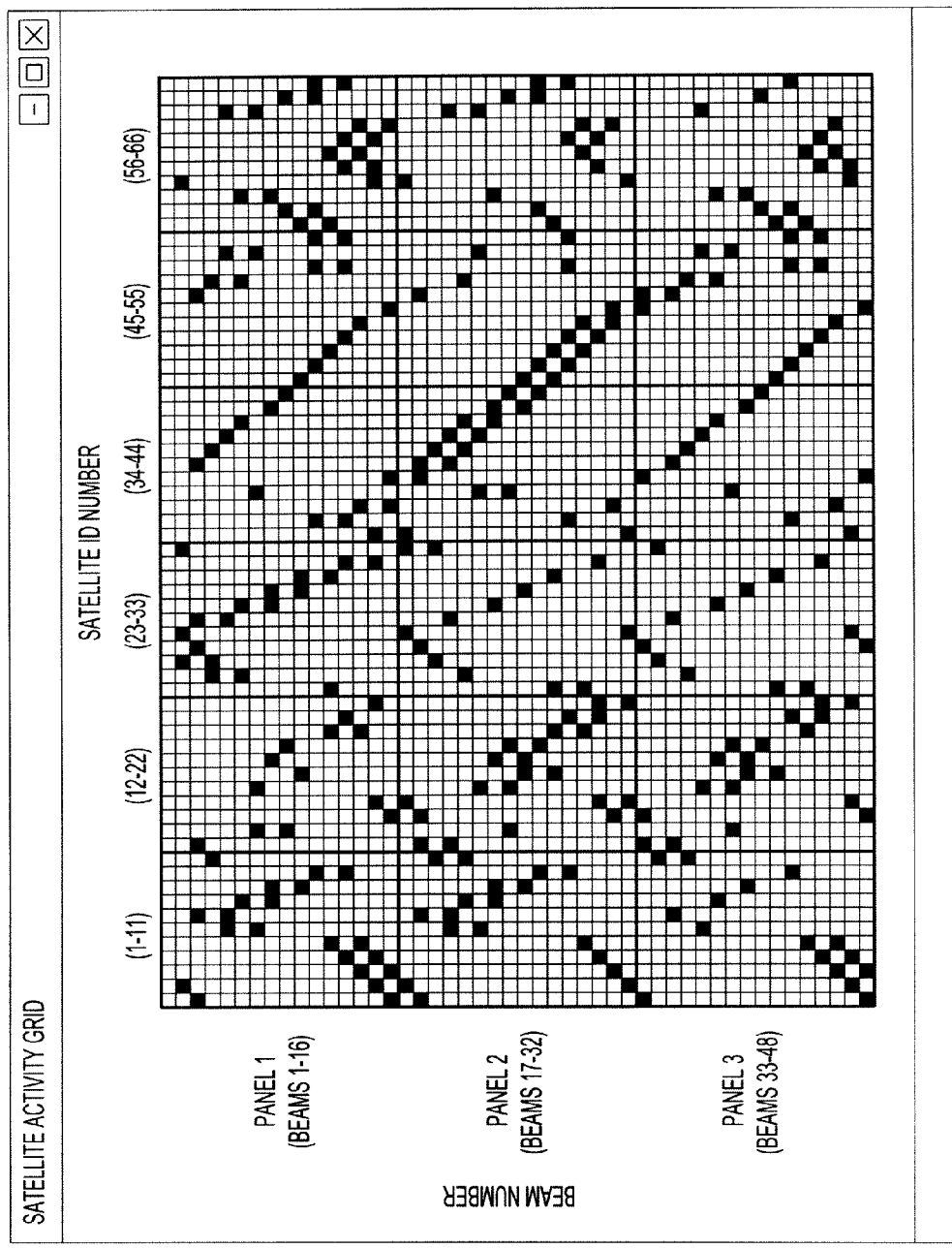
FIG. 10 is a screen shot of a "satellite activity grid" visual data presentation according to an embodiment of the invention.

An example of a satellite activity grid view of call activity is shown in FIG. 10. At any given time, there are 66 operational satellites in the Iridium constellation, and each satellite has three antenna panels with 16 spot beams for a total of 48 spot beams per satellite. The satellite activity grid is essentially a two-dimensional grid, 66 by 48, of boxes, where each box represents the call activity of a particular spot beam of a particular satellite.

Specifically, the satellite ID (SVID) of each satellite is listed along the horizontal x-axis, and the beam numbers are listed along the vertical y-axis. In FIG. 10, the satellite ID numbers are listed according to the six satellite planes with 11 satellites per plane, i.e., 1-11, 12-22, etc. due to font constraints (the planes are polar orbits evenly spaced around the Earth). In practice, the satellite ID numbers can be listed individually, with one number above each column. In general, the satellite ID numbers need not necessarily be listed sequentially 1-66; rather, the actual satellite numbers per plane can be laid out in a configuration file read at startup so that the numbers may be updated and grouped correctly when one satellite is replace by another. For ease of visual inspection, the different satellite planes can be differentiated visually within the display, with somewhat more space in the horizontal direction between the column of the last satellite in each plane and the column of the first satellite in the next plane, as shown in FIG. 10.

In contrast to the SV numbers, the beam numbers can be listed sequentially from 1-48 from top to bottom, for example, along the vertical axis, with one beam number to the left of each row. The first 16 beam numbers correspond to antenna panel 1 of the satellite, the next 16 beam numbers correspond to antenna panel 2 of the satellite, and the last 16 beam numbers correspond to antenna panel 3 of the satellite. For ease of visual inspection, a somewhat greater spacing can be shown between rows 16 and 17 and between rows 32 and 33 to delineate the three panels within the satellite activity grid, as shown in FIG. 10.

As with the geo view, the satellite activity grid view shows a time progression of call activity (live or playback mode), where data from a sliding time window is depicted at any given instant. In this case, each box or section of the grid reflects the call activity associated with a particular spot beam of a particular satellite. In the black-and-white graph in FIG. 10, individual boxes are either white or black to indicate the presence or absence of call activity. In practice, a more extensive color-coding scheme can be used to depict call levels in much the same way a radar map shows the intensity of precipitation or a thermal image shows heat, via a spectrum of colors. Such color coding is highly effective in generating a visual impression of call load hot spots as a function of the satellites, antenna panels, and spot beams and, hence, at certain ground locations. Optionally symbols, icons, or other visual indicators such as blinking can be used instead of or in addition to a color differentiation scheme.

The satellite grid activity view can be filtered according to specified display control settings to show only selected call activity information, as previously described, using a drop-down menu or list within the satellite activity grid window or in another window.

An example of a message view visual data presentation is shown in FIG. 11. The message view is essentially a window with a listing or log of individual messages within the call activity being viewed. At present, the Iridium system typically handles over two million calls per day or roughly 80,000 calls per hour on average. Thus, showing every message of every call in the message view would be of limited value without significant filtering of the data to limit the listing to a selected segment of the overall call activity.

As shown in FIG. 11, the message view is essentially a table with a header line that includes a number of column headers identifying the messages in the selected group and attributes of the messages. Each row in the table includes the message identifier (e.g., a message number) and attribute information for that message, such that a listing of messages extends vertically down the display window. The message view is configurable such that the user can select the attributes of the messages shown in the window. In the example shown in FIG. 11, the following attribute fields are included: "ESL," which identifies one of four possible signal-carrying links within a particular gateway/TTAC facility; "Port," which indicates which direction data is coming from or going to (ETS or ECS indicates a point of entry); "Direction," which is specified as either inbound to or outbound from a data source router; "Frame Type," which specifies signaling protocol frame type such as S-frame or I-frame; and "Message Type." It will be understood that the set of attributes shown in FIG. 11 is just one example, and any combination of a great variety of attributes can be shown in the message view according to the user's preferences.

Optionally, the message view is a visual data presentation that can be drilled into from a hyperlink within the geo view or satellite activity grid view by selecting a particular data point, area, or grid point from these views to see more specific information about call activity for a particular call, satellite, antenna panel, spot beam, geographic area, etc. As with the geo and satellite activity grid views, the message view can be filtered according to specific call attributes to facilitate more detail analysis and diagnostics. Either by a hyperlink or by filtering via a menu system, the message view permits filtering all the way down to the messages associated with a single call. Further, filtering options can allow messages of calls "associated with" a particular call to be included in the listing (e.g., those within a certain mile radius, those being handled by the same spot beam, those that have dialed the same digits dialed for this call, etc.). In this manner, different kinds of associations can be viewed to allow causal relationships to be discerned, thereby allowing an operator to better understand and address the network's shortcomings.

Figure 12:
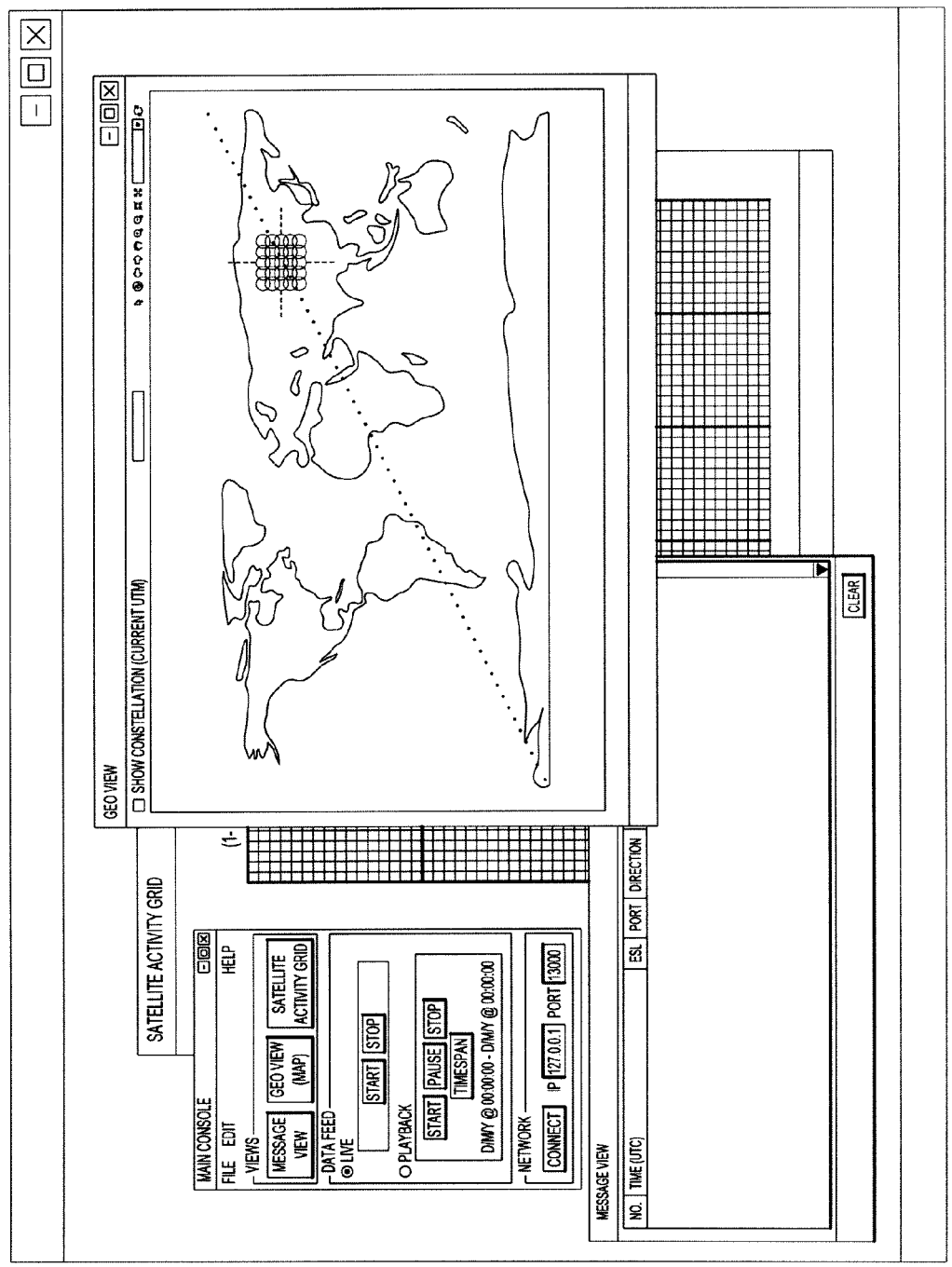
FIG. 12 is a screen shot of a display screen showing a geo view window, a satellite activity grid window, and a message view window along with a main console window according to an embodiment of the invention.

FIG. 12 is a screen shot of a geo view window, a satellite activity grid window, and a message view window overlaid in a display screen along with a main console window. The main console window can be used to select the previously described display control settings, including the temporal display parameters and filtering parameters based on call activity attributes, in order to control the visual display presentations in the windows. Since the visual data presentations are time progression renderings, optionally, user interface module 230 can be configured to allow the user to freeze or pause the views on the fly or to fast forward or reverse the time progression being shown. For example, in the live mode, user interface module 230 can allow the user to freeze the visual data presentations and then to resume and subsequently fast forward to the present time, much in the same manner as a DVR-equipped cable box.

While three specialized visual data presentations have been described herein, it will be appreciated that additional visual data presentations could be used to support network monitoring in a satellite-based communication network.

Having described preferred embodiments of methods, apparatus, and software for monitoring of network call activity in a satellite-based communication system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for monitoring network call activity in a satellite-based communication network, comprising:
    a user interface configured to receive display control settings for selecting a visual data presentation format for depiction of call activity from among a plurality of different available visual data presentation formats that include a geo view visual data presentation format and a satellite activity grid visual data presentation format in which a time progression of live or recorded call activity data is depicted on a two-dimensional grid of antenna spot beams;
    a network interface configured to supply requests for call activity data to at least one data server over a network and to receive the call activity data from the at least one data server;
    a processor configured to process the call activity data received from the at least one data server in accordance with the display control settings; and
    a display device configured to display a visual data presentation depicting a time-progression representation of call activity in accordance with the processed call activity data and the selected visual data presentation format.

2. The apparatus of claim 1, wherein the display control settings include temporal display parameters, including a live mode setting that configures the apparatus to display the visual data presentation of call activity in real time, and a playback mode setting that configures the apparatus to display the visual data presentation based on previously recorded call activity data.

3. The apparatus of claim 2, wherein the temporal display parameters include a time window setting that specifies a period of time over which call activity data to be displayed at a given instant is aggregated by the processor.

4. The apparatus of claim 2, wherein the temporal display parameters include a time-span selection that specifies a past period of time over which the time-progression representation of call activity is depicted in the visual data presentation in the playback mode.

5. The apparatus of claim 1, wherein:
    the display control parameters include data filtering parameters based on call activity attributes;
    the display device is configurable to filter the visual data presentation to represent only selected call activity based on the data filtering parameters; and
    at least some of the data filtering parameters are supplied to the at least one data server to filter the call activity data supplied to the apparatus.

6. The apparatus of claim 5, wherein the call activity attributes associated with individual calls or messages include an identification of at least one of: a satellite, satellite antenna panel, and a satellite beam.

7. The apparatus of claim 1, wherein the display device is configured to display a geo view visual data presentation in accordance with a selected geo view visual data presentation format in which a time progression of live or recorded call activity data is depicted geographically on a map.

8. The apparatus of claim 7, wherein the geo view visual data presentation format includes an overlay of satellite beam footprints on the map.

9. The apparatus of claim 1, wherein the display device is configured to display a message view visual data presentation in accordance with a selected message view visual data presentation format in which a time progression of live or recorded call activity data is depicted as a listing of individual messages and selected call activity attributes associated with the individual messages.

10. A network monitoring system, comprising:
    at least one user interface module comprising the apparatus of claim 1;
    the at least one data server; and
    at least one data source router configured to collect call activity data from within a terrestrial portion of the satellite-based communication network and to supply the call activity data to the at least one data server,
    wherein the at least one user interface module, the at least one data server, and the at least one data source router are coupled via a routable network.

11. A method of monitoring network call activity in a satellite-based communication network, the method comprising:
    receiving display control settings for selecting a visual data presentation format for depiction of call activity from among a plurality of different available visual data presentation formats that include a geo view visual data presentation format and a satellite activity grid visual data presentation format in which a time progression of live or recorded call activity data is depicted on a two-dimensional grid of antenna spot beams;
    requesting call activity data from at least one data server in accordance with at least some of the display control settings;
    receiving the call activity data from the at least one data server; and
    controlling the display device to display a visual data presentation depicting a time-progression representation of call activity in accordance with the call activity data and the selected visual data presentation format.

12. The method of claim 11, wherein the display control settings include temporal display parameters, including a live mode setting that configures the display device to display the visual data presentation of call activity in real time, and a playback mode setting that configures the display device to display the visual data presentation based on previously recorded call activity data.

13. The method of claim 12, wherein the temporal display parameters include a time window setting that specifies a period of time over which call activity data to be displayed at a given instant is aggregated.

14. The method of claim 12, wherein the temporal display parameters include a time-span selection that specifies a past period of time over which the time-progression representation of call activity is depicted in the visual data presentation in the playback mode.

15. The method of claim 11, wherein:
    the display control parameters include data filtering parameters based on call activity attributes;
    requesting call activity data includes supplying at least some of the data filtering parameters to the at least one data server to filter the call activity data received; and
    controlling the displaying device includes displaying in the visual data presentation only selected call activity based on the data filtering parameters.

16. The method of claim 15, wherein the call activity attributes associated with individual calls or messages include an identification of at least one of: a satellite, satellite antenna panel, and a satellite beam.

17. The method of claim 11, wherein the display device is controlled to display a geo view visual data presentation in accordance with a selected geo view visual data presentation format in which a time progression of live or recorded call activity data is depicted geographically on a map.

18. The method of claim 17, wherein the geo view visual data presentation format includes an overlay of satellite beam footprints on the map.

19. The method of claim 11, wherein the display device is controlled to display a message view visual data presentation in accordance with a selected message view visual data presentation format in which a time progression of live or recorded call activity data is depicted as a listing of individual messages and selected call activity attributes associated with the individual messages.

20. A processor readable medium storing instructions that, when executed by a processor, cause the processor to:
  receive display control settings for selecting a visual data presentation format for depiction of call activity from among a plurality of different available visual data presentation formats that include a geo view visual data presentation format and a satellite activity grid visual data presentation format in which a time progression of live or recorded call activity data is depicted on a two-dimensional grid of antenna spot beams;
  request call activity data from at least one data server in accordance with at least some of the display control settings;
  receive the call activity data from the at least one data server; and
  control the display device to display a visual data presentation depicting a time-progression representation of call activity in accordance with the call activity data.

21. The processor readable medium of claim 20, wherein:
  the instructions that cause the processor to receive display control settings include instructions that cause the processor to receive temporal display parameters, including a live mode setting or a playback mode setting; and
  the instructions that cause the processor to control the display device include instructions that cause the processor to control the display device to display the visual data presentation of call activity in real time in response to the live mode setting and to display the visual data presentation based on previously recorded call activity data in response to the playback mode setting.

22. The processor readable medium of claim 21, wherein:
  the instructions that cause the processor to receive temporal display parameters include instructions that cause the processor to receive a time window setting; and
  the instructions that cause the processor to control the display device include instructions that cause the processor to control the display device to display, at a give instant, call activity data that has been aggregated over a period of time specified by the time window setting.

23. The processor readable medium of claim 21, wherein:
  the instructions that cause the processor to receive temporal display parameters include instructions that cause the processor to receive a time-span selection; and
  the instructions that cause the processor to control the display device include instructions that cause the processor to control the display device to display, in playback mode, the time-progression representation of call activity from a past period of time specified by the time-span selection.

24. The processor readable medium of claim 20, wherein:
  the instructions that cause the processor to receive display control settings include instructions that cause the processor to receive data filtering parameters based on call activity attributes;
  the instructions that cause the processor to request call activity data includes instructions that cause the processor to supply at least some of the data filtering parameters to the at least one data server to filter the call activity data received; and
  the instructions that cause the processor to control the display device include instructions that cause the processor to control the display device to display in the visual data presentation only selected call activity based on the data filtering parameters.

25. The processor readable medium of claim 20, wherein the instructions that cause the processor to control the display device include instructions that cause the processor to control the display device to display a geo view visual data presentation in accordance with a selected geo view visual data presentation format in which a time progression of live or recorded call activity data is depicted geographically on a map.

26. The processor readable medium of claim 25, wherein the instructions that cause the processor to control the display device include instructions that cause the processor to control the display device to display a geo view visual data presentation in which an overlay of satellite beam footprints is displayed on the map.

27. The processor readable medium of claim 20, wherein the instructions that cause the processor to control the display device include instructions that cause the processor to control the display device to display a message view visual data presentation in accordance with a selected message view visual data presentation format in which a time progression of live or recorded call activity data is depicted as a listing of individual messages and selected call activity attributes associated with the individual messages.

* * * * *